July 20, 1965     I. M. LEVY     3,195,502

TISSUE RECEPTACLE

Filed Oct. 22, 1962

INVENTOR.
IRA M. LEVY
BY Harry Cohen
ATTORNEY

United States Patent Office 3,195,502
Patented July 20, 1965

3,195,502
TISSUE RECEPTACLE
Ira M. Levy, Yonkers, N.Y., assignor to The Technicon Company, Inc., Chauncey, N.Y., a corporation of New York
Filed Oct. 22, 1962, Ser. No. 231,966
6 Claims. (Cl. 118—500)

This invention relates to the art of processing human or animal tissue for microscopic examination and, more particularly, to receptacles for holding tissue specimens for immersion in the liquids with which the tissue is treated for such processing.

The primary object of the invention is to provide tissue receptacles with simple and inexpensive identification means so that a large number of tissue specimens can be processed simultaneously without danger of confusion as to the identity of the specimens.

An ancillary object is to provide an identification device which can be readily applied to and removed from the tissue receptacle and which is sufficiently inexpensive to be used once and thereafter discarded.

The above and other objects, features and advantages of the invention will be fully understood from the following description considered in conjunction with the accompanying illustrative drawings in which.

Figure 5:
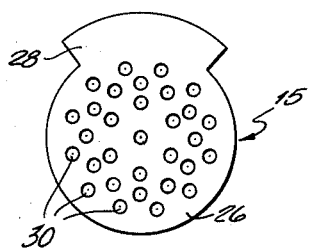
FIG. 5 is a side view of the identification device itself.

Referring to the drawings in detail, the receptacle 10 comprises a perforate receptacle body 12 and a removable perforate cover both preferably made of stainless steel but which can be made of other materials including various metals which are inert to the liquids with which the tissue specimen are treated. Said receptacle is provided with an identification member 15 (FIG. 5) hereinafter described in detail.

Ordinarily, the liquids in which the tissue is immersed while in the perforate receptacle 10 are, in the sequence of immersion, fixatives, dehydrants, clearing agents and melted paraffin, and ordinarily an automatic immersion apparatus provided with a perforate basket to hold a number of receptacles 10 is employed so that a large number of tissue receptacles can be put through each of the several liquid immersion operations simultaneously. Suitable immersion apparatus or tissue processors are shown, for example, by United States Patents Nos. 2,341,197 and 2,872,893, and others owned by the assignee of this application.

Figure 1:
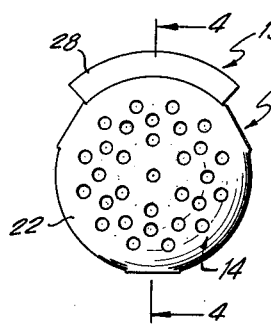
FIG. 1 is a top view of the receptacle according to the presently preferred embodiment of the invention.
Figure 2:
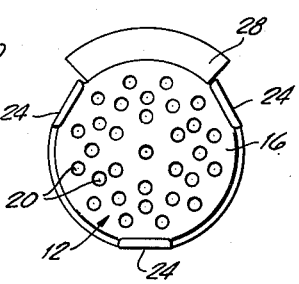
FIG. 2 is a bottom view thereof.
Figure 3:
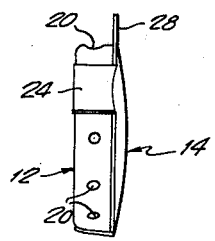
FIG. 3 is a side view thereof.

The receptacle body 12 comprises a bottom 16 and a peripheral side wall 18, both of which are provided, as here shown, with a plurality of small openings 20. Said side wall 18 is preferably cylindrical. The cover 14 comprises a flexible disk 22 provided with the circumferentially spaced fingers 24 which are integral with said disk. Because of the flexibility of disk 22 it can be flexed inwardly, i.e., toward the bottom 16 of the receptacle, from the disposition shown by the drawings so as to automatically move the fingers radially away from and thereby out of holding engagement with the side wall so that cover 14 can be easily removed from the receptacle body 12. In order to secure the cover 14 to the receptacle body 12, said cover with its fingers 24 in outwardly sprung disposition is placed in position and said fingers are pressed simultaneously against the side wall 18 resulting in disk 22 being automatically flexed to the outwardly convex condition illustrated by FIGS. 3 and 4 with concomitant firm spring engagement of said fingers with side wall 18 for releasably securing the cover in position.

Figure 4:
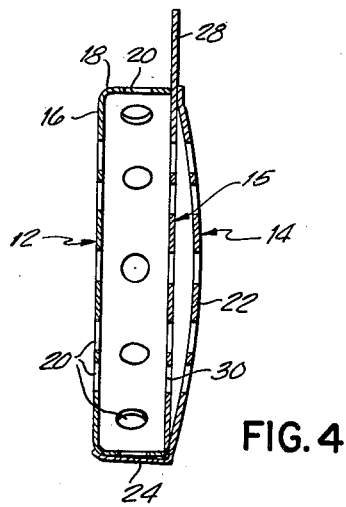
FIG. 4 is an enlarged sectional view on the line 4—4 of FIG. 1.

The identification member 15 is preferably of the construction shown by FIGS. 1 to 5. It can be made of any suitable material, for example, thin cardboard or comparatively stiff paper sufficiently strong to resist disintegration by the tissue-processing liquids. It will be understood that member 15 can be made of any inert sheet material on which identification data can be written or otherwise applied. Said member 15 has a perforate part 26, the outer marginal edge portion of which engages the outer edge of wall 18, and an integral part or tab 28 which projects from part 26 and is positioned externally of the receptacle. It will be noted that member 15 is releasably secured in position by the engagement therewith of the marginal edge portion of disk 22 of the cover which releasably clamps part 26 against the edge of wall 18 as clearly shown by FIG. 4. It will be noted that the holes 30 in member 15 provide a passage for the liquid which enters and leaves the receptacle through the holes in cover 14. The holes in the receptacle body and cover can be small enough to prevent the passage therethrough of minute pieces of tissue, for example biopsy tissue. The holes 30 are preferably of the same size as the holes of the receptacle and are arranged so as to register with the holes in cover disk 22. As FIG. 4 is on a much larger scale than the actual receptacle, part 26 of the cover disk 22 is there shown spaced from the confronting surface of said disk, but in the actual receptacle the confronting surfaces of part 30 and cover disk 22 are much closer to each other.

It will be understood that tab 28 provides a surface on the identification member 15 to receive the patient's name or number or other tissue-identification data, so that this information is available for inspection without removal of the cover 14. Preferably the tab 28, which, as shown, is positioned between two fingers 24 of the cover, extends from one to the other of these two fingers.

Figure 6:
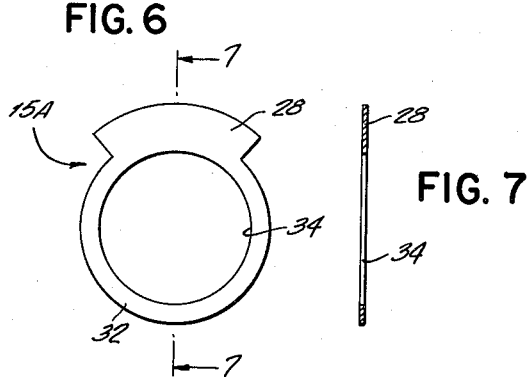
FIG. 6 is a side view of another form of the identification device.
Figure 7:
FIG. 7 is a sectional view on the line 7—7 of FIG. 6.

The identification member 15A shown by FIGS. 6 and 7 is the same as member 15 except that instead of having a part 26 provided with a liquid passage formed by a plurality of openings, it has an annular part 32 which has an inner edge 34 which defines the liquid passage in the form of a single opening. It will be understood that when member 15A is used, part 34 engages the outer edge of wall 18 and is releasably clamped in position by the marginal edge of cover disk 22.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

I claim:

1. A tissue receptacle for use in processing human or animal tissue specimens for microscopic examination, comprising a receptacle body and a removable cover therefor releasably securable to said receptacle body, said receptacle having a plurality of openings for the passage of tissue-processing liquid into the receptacle, and an identification member mountable in said receptacle to identify the tissue therein, said identification member having a plurality of openings for the passage therethrough of tissue processing fluid, said cover comprising a flexible disk and circumferentially spaced fingers releasably engageable with the receptacle body for said securement of the cover thereto, said identification member having a part projecting from said first mentioned part to a position externally of the receptacle between two of said fingers of the cover.

2. A tissue receptacle for use in processing human or animal tissue specimens for microscopic examination, comprising a receptacle body and a removal cover therefor releasably securable to said receptacle body, said receptacle having a plurality of openings for the passage of tissue-processing liquid into the receptacle, and an identification member mountable in said receptacle to identify the tissue therein, said cover comprising a flexible disk and circumferentially spaced fingers releasably engageable with the receptacle body for said securement of the cover thereto, said identification member having a part projecting externally of the receptacle between two of said fingers of the cover, said identification member having a plurality of openings therethrough in registry with it least some of said openings of the receptacle for the passage of the processing liquid.

3. A tissue receptacle for use in processing human or animal tissue specimens for microscopic examination, comprising a receptacle body and a removable cover therefor releasably securable to said receptacle body, said receptacle having a plurality of openings for the passage of tissue-processing liquid into the receptacle, and an identification member mountable in said receptacle to identify the tissue therein, said cover comprising a flexible disk and circumferentially spaced fingers releasably engageable with the receptacle body for said securement of the cover thereto, said identification member having a part projecting externally of the receptacle between two of said fingers of the cover, said identification member having a liquid passage therein in registry with at least some of said openings of the receptacle.

4. A tissue receptacle for use in processing human or animal tissue specimens for microscopic examination, comprising a receptacle body and a removable cover therefor releasably securable to said receptacle body, said receptacle having a plurality of openings for the passage of tissue-processing liquid into the receptacle, and an identification member mountable in said receptacle to identify the tissue therein, said identification member having an annular part within said receptacle and defining a liquid passage in registry with at least some of said receptacle openings, said cover comprising a flexible disk and circumferentially spaced fingers releasably engageable with the receptacle body for said securement of the cover thereto, said identification member having a part projecting externally of the receptacle between two of said fingers of the cover.

5. A tissue receptacle for use in processing human or animal tissue specimens for microscopic examination, comprising a receptacle body and a removable cover therefor releasably securable to said receptacle body, said receptacle having a plurality of openings for the passage of tissue-processing liquid into the receptacle, and an identification member mountable in said receptacle to identify the tissue therein, said cover comprising a flexible disk and circumferentially spaced fingers releasably engageable with the receptacle body for said securement of the cover thereto, said identification member having a part projecting externally of the receptacle between two of said fingers of the cover, said identification member having a liquid passage therein in registry with at least some of said openings of the receptacle, said externally projecting part of said identification member extending circumferentially from one of said two fingers to the other of said two fingers of the cover.

6. A tissue receptacle for use in processing human or animal tissue specimens for microscopic examination, comprising a receptacle body and a removable cover therefor releasably securable to said acceptable body, said receptacle having a plurality of openings for the passage of tissue-processing liquid into the receptacle, and an identification member mountable in said receptacle to identify the tissue therein, said identification member having an annular part within said receptacle and defining a liquid passage in registry with at least some of said receptacle openings, said cover comprising a flexible disk and circumferentially spaced fingers releasably engageable with the receptacle body for said securement of the cover thereto, said identification member having a part projecting from said annular part to a position externally of the receptacle between two of said fingers of the cover, said externally projecting part of said identification member extending circumferentially from one of said two fingers to the other of said two fingers of the cover.

References Cited by the Examiner

UNITED STATES PATENTS

| | | | |
|---|---|---|---|
| 1,464,237 | 8/23 | Beyer | 220—60 |
| 2,024,227 | 12/35 | Jones | 220—60 |
| 2,800,102 | 7/57 | Weiskopf | 118—502 X |
| 2,837,055 | 6/58 | Whitehead | 118—500 |

RICHARD D. NEVIUS, *Primary Examiner.*